Nov. 27, 1928.

J. FAHRNI 1,693,373

REFRIGERATING APPARATUS

Filed Sept. 18, 1926

Inventor:
Jacob Fahrni
by Kuehaetin
Atty.

Patented Nov. 27, 1928.

1,693,373

UNITED STATES PATENT OFFICE.

JACOB FAHRNI, OF ZURICH, SWITZERLAND.

REFRIGERATING APPARATUS.

Application filed September 18, 1926, Serial No. 136,316, and in Switzerland July 26, 1926.

My invention relates to refrigerating apparatus and more particularly to apparatus for making ice, and it is an object to provide an apparatus of the kind described in which several sorts of ice can be made at the same time. To this end I provide a plurality of containers in a tank which is adapted to receive a refrigerating medium, and I charge these containers with the materials to be refrigerated, for instance cream, water, milk and the like.

The tank is made of insulating material, preferably wood substance, and may be impregnated on its outer and inner surfaces, but must not be impregnated throughout as this would detract from its insulating qualities. The tank may be provided with an insertion of any keramic material.

In the drawings affixed to this specification and forming part thereof an apparatus of the kind described is illustrated diagrammatically by way of example.

In the drawings

Figure 1:
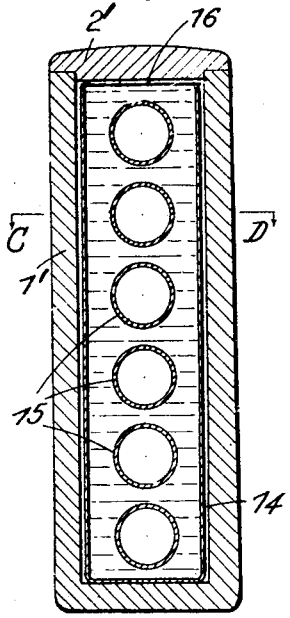
Fig. 1 is a longitudinal section.
Figure 2:
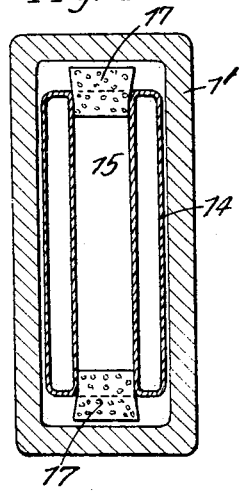
Fig. 2 is a cross section on the line C—D in Fig. 1.

In the square apparatus illustrated in Figs. 1 and 2, a square casing 14 of sheet metal or the like is inserted in the tank 1' which may be of insulating material, preferably wood substance, and is closed by a cover 2'. The casing 14 is open at the top as indicated at 16, and equipped with horizontal cylinders 15 which are open at both ends and closed by plugs 17 of rubber or the like. The casing 14 is charged with the refrigerating medium through its opening 16, and the cylinders 15 are charged with the material to be refrigerated.

The refrigerating medium in the casing 14 is agitated by shaking the apparatus.

It will be understood that the cylinders 15 may be of any other suitable shape, and of any suitable material, glass, metal or the like.

In my apparatus various sorts of ice may be prepared in the several containers, for instance one of them may be charged with strawberry ice cream, the other with raspberry ice cream, the third with pure water, etc.

I wish it to be understood that I do not desire to be limited to the exact details of construction shown and described for obvious modifications will occur to a person skilled in the art.

I claim:—

1. Refrigerating apparatus comprising a square tank, a detachable lid on said tank, a casing adapted to receive a refrigerating medium and to be inserted in said tank and a plurality of containers adapted to receive the material to be refrigerated secured in said casing.

2. Refrigerating apparatus comprising a square tank, a detachable lid on said tank, a casing adapted to receive a refrigerating medium and to be inserted in said tank and a plurality of containers adapted to receive the material to be refrigerated secured in said casing and extending from one of its end walls to the other.

In testimony whereof I affix my signature.

JACOB FAHRNI.